United States Patent [19]

Dunn et al.

[11] 4,248,249
[45] Feb. 3, 1981

[54] COMBINE ROTOR DRIVE ANTI-TRASH SYSTEM

[75] Inventors: Neil C. Dunn, Moline; Robert L. Francis, East Moline; Harold E. Smith, Colona, all of Ill.

[73] Assignee: International Harvester Company, Chicago, Ill.

[21] Appl. No.: 54,353

[22] Filed: Jul. 2, 1979

[51] Int. Cl.³ .................. A01F 7/06; A01F 12/54; A01F 12/18
[52] U.S. Cl. .................. 130/27 T; 56/14.6
[58] Field of Search .......... 130/27 R, 27 T, 27 H, 130/27 S, 27 Z, 27 AA, 27 P; 56/13.4, 14.6

[56] References Cited

U.S. PATENT DOCUMENTS

| 2,669,826 | 2/1954 | Watrous | 56/13.4 |
|---|---|---|---|
| 2,815,634 | 12/1957 | Bush | 56/13.4 |
| 2,910,819 | 11/1959 | Holliwell | 56/220 |
| 2,953,888 | 9/1960 | Phillips, Jr. et al. | 56/13.4 |
| 3,000,165 | 9/1961 | Lill | 56/13.4 |
| 3,522,693 | 8/1970 | Knapp | 56/1 |
| 3,589,111 | 6/1971 | Gullickson et al. | 130/27 T |
| 4,148,323 | 4/1979 | McMillin et al. | 130/27 T |

Primary Examiner—Paul J. Hirsch
Attorney, Agent, or Firm—Neal C. Johnson; F. David AuBuchon

[57] ABSTRACT

An axial flow combine having a crop harvesting header including a feeder for cutting a crop and feeding it rearwardly into a threshing and separating mechanism. The mechanism includes a casing for receiving the crop material and a rotor within the casing for threshing and separating grain from the crop material. The rotor has a central drive shaft driven through a gear case behind the rotor. The gear case is partially enclosed within a cover having a smooth exterior surface. The end of the rotor is configured in a smooth exterior surface which is complementary to the surface of the cover to inhibit collection of chaff about the drive shaft. Impeller blades are secured on the rotor for creating an air flow directing crop material away from the drive shaft to prevent crop material wrapping about the shaft or accumulating in the drive system.

5 Claims, 6 Drawing Figures

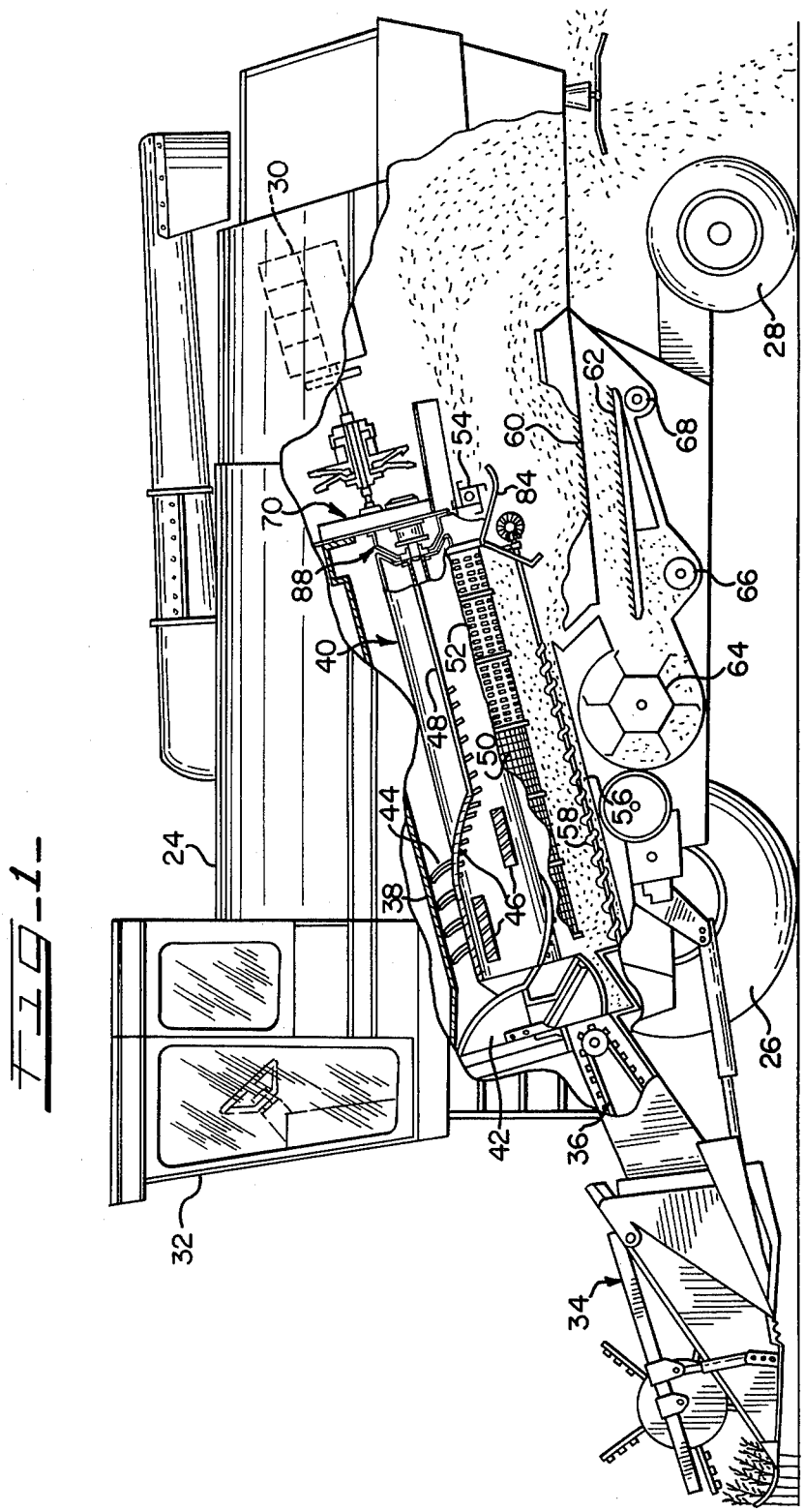

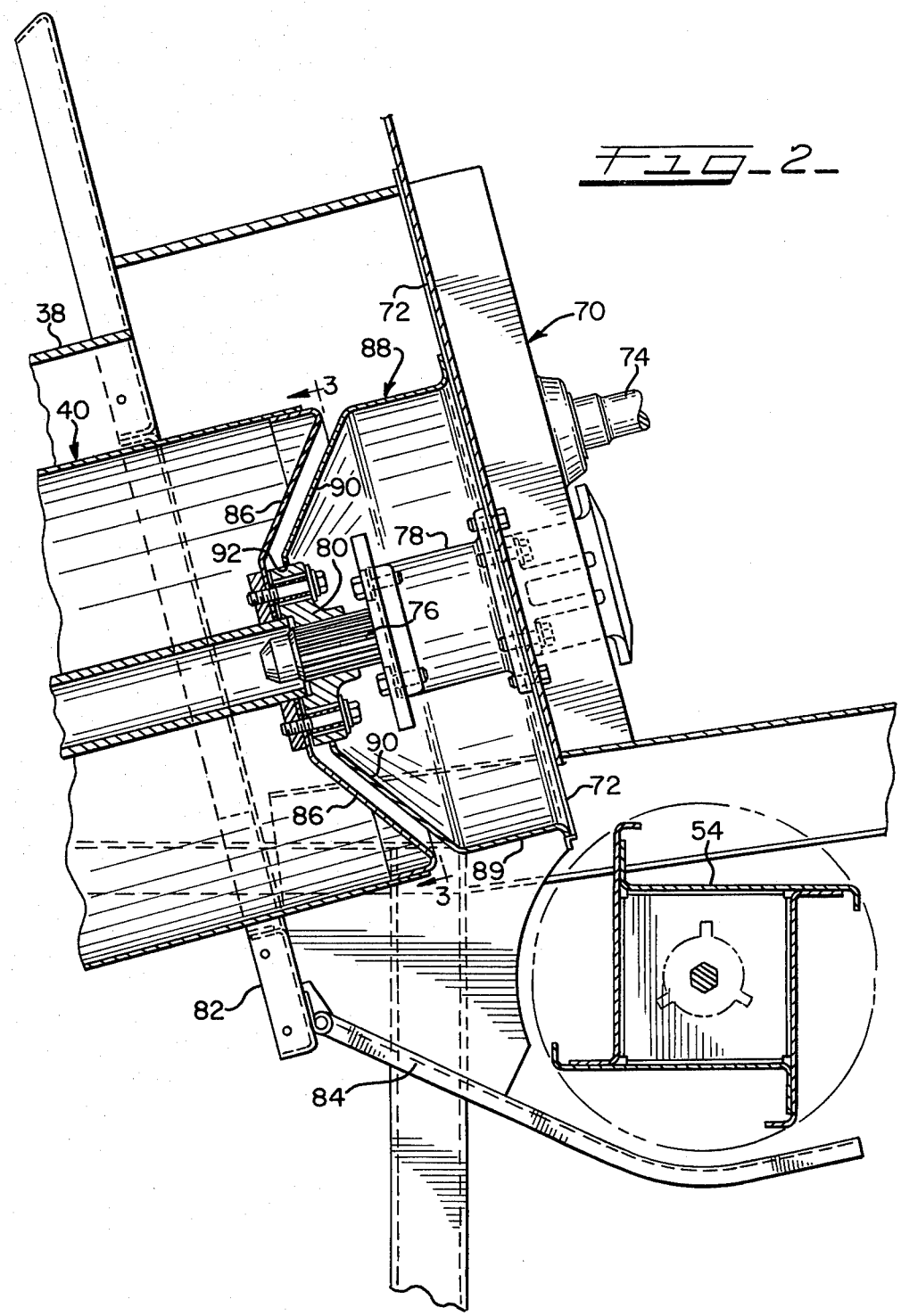

Fig-3-
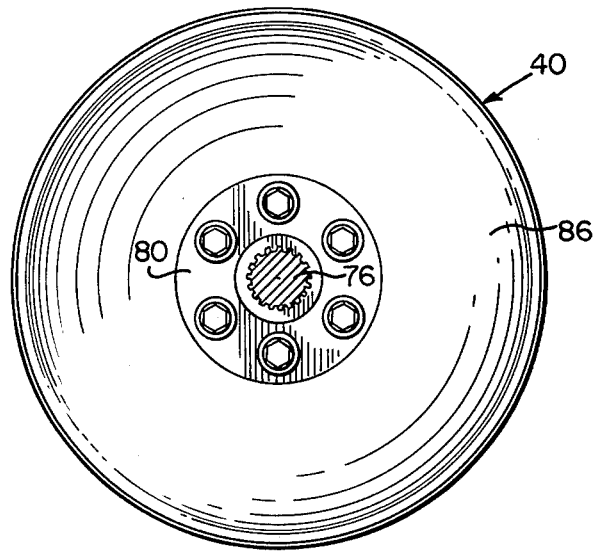
Fig-4-
PRIOR ART
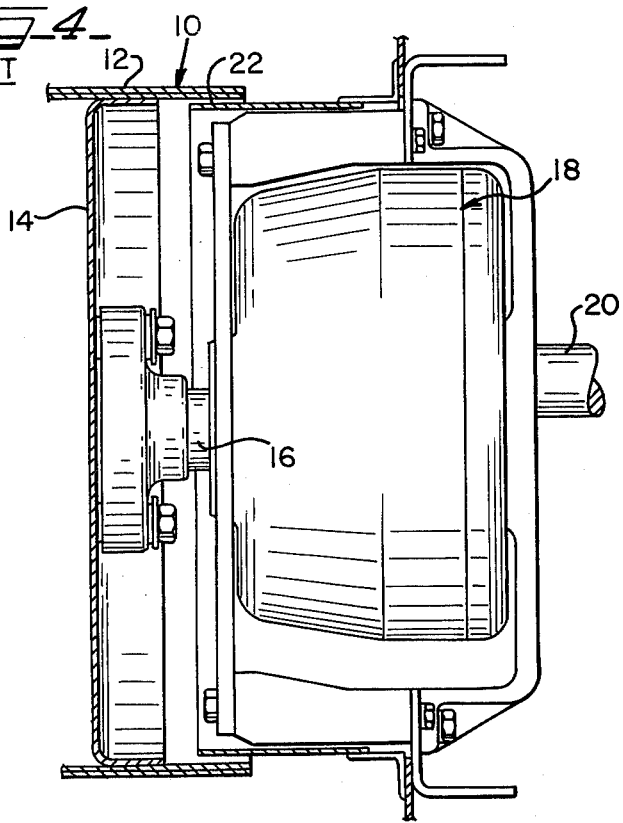

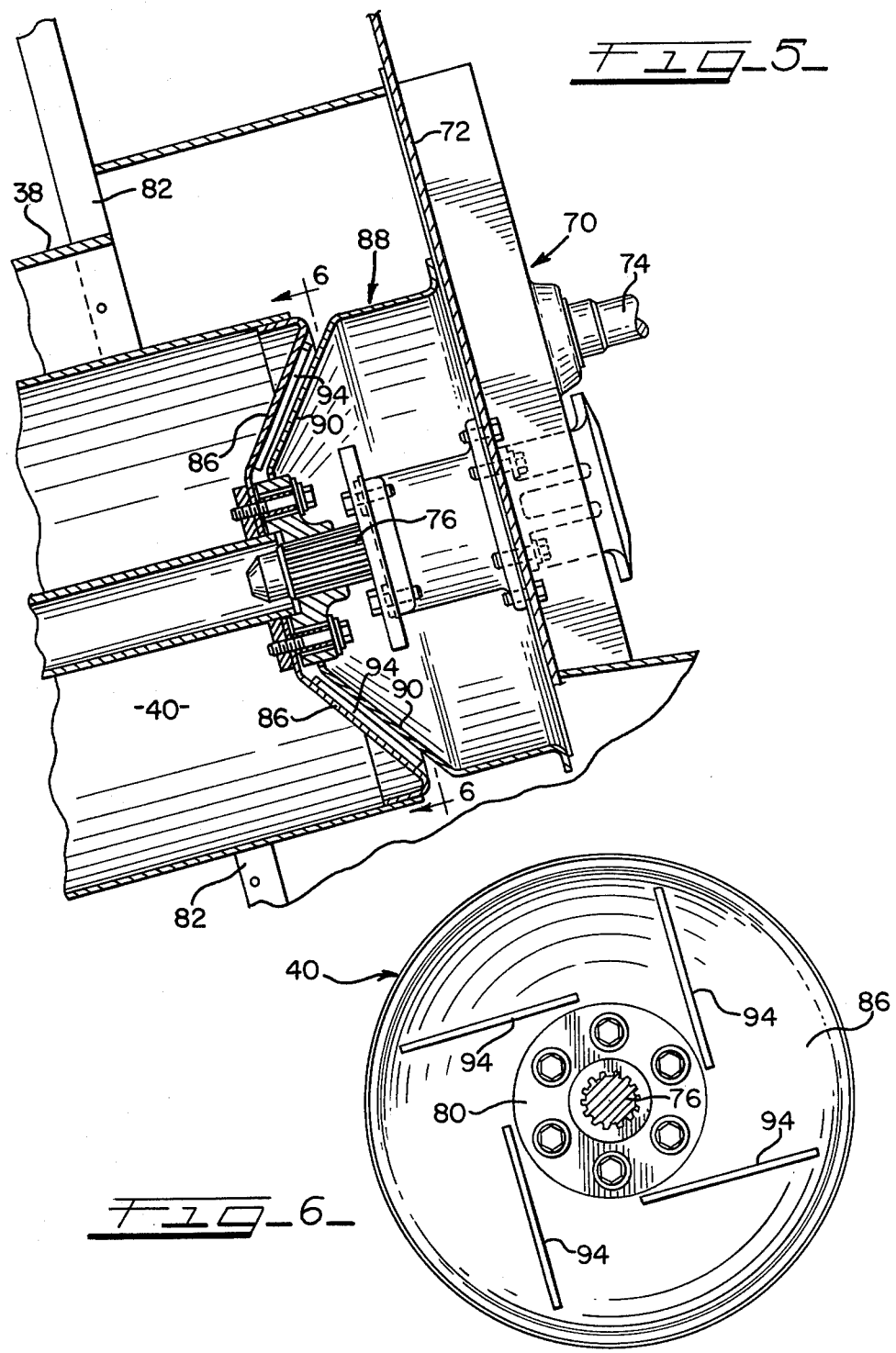

COMBINE ROTOR DRIVE ANTI-TRASH SYSTEM

BACKGROUND OF THE INVENTION

1. Field of the Invention

The invention relates generally to axial flow combines and more particularly to an improved rotor drive anti-trash system.

2. Prior Art

FIG. 4 of this application shows an example of the prior art in protecting a rotor drive shaft against wrapping of crop material about the shaft and minimizing accumulation of "trash" adjacent the drive system of the rotor. The rotor 10 is shown in fragmentary section and includes a cylindrical drum 12, a rear end wall 14, and a central drive shaft 16 defining the axis of rotation of the rotor. The rotor drive shaft 16 is driven through a gear case 18 having an input shaft 20.

It will be noted that the rotor drum 12 extends rearwardly beyond the rotor end wall 14 so as to axially overlap a ring 22 fixedly secured around the gear case 18. It is this overlap which inhibits the entry of crop material into the generally annular space about the drive shaft 16 and between the end wall 14 and gear case 18. In practice the threshing process creates small particles of crop material which can pass between the drum 12 and ring 22 and collect in the above described annular space. The accumulation of material is particularly undesirable when it is very dry and thus subject to combustion by the heat of friction of the rotating mechanism.

While it might appear that an obvious solution lies in developing a more effective seal between the rotor and gear case, the problems of wear, repair, and replacement of such a seal remain for solution.

SUMMARY

The invention provides an anti-trash system for the rotor drive of an axial flow combine. In one embodiment the driving mechanism is provided with a cover having a smooth annular surface disposed about the rotor drive shaft. The end of the rotor adjacent to the driving mechanism is configured with a smooth surface disposed in spaced complementary relation to the smooth surface of the cover. These surfaces define an annular space which inhibits entry of chaff or other crop material into the driving mechanism. Preferably, the surfaces are frusto-conical to further inhibit material entry. In another embodiment, the rotor includes means for creating an air stream which directs crop material away from the drive shaft and driving mechanism of the rotor. More particularly, impeller blades are secured on the end of the rotor adjacent to the drive mechanism.

It is a primary object of the invention to prevent wrapping of crop material on the drive shaft of a rotor for an axial flow combine.

It is a further important object to prevent the accumulation of finely divided material or "trash" in areas adjacent to the relatively moving rotor and its drive system to eliminate the possibility of combustion of the material.

It is a more general object to create a more efficient rotor drive system in eliminating or reducing wear caused by accumulation of trash.

BRIEF DESCRIPTION OF THE DRAWINGS

FIG. 1 is a side elevation, partly broken away, of an axial flow combine having one embodiment of the improved rotor drive anti-trash system of the invention;

FIG. 2 is a fragmentary enlarged section of the improved system of FIG. 1;

FIG. 3 is an end view of the rotor of FIG. 2 taken generally along lines 3—3;

FIG. 4 is a fragmentary plan view of an arrangement of the prior art;

FIG. 5 is a fragmentary section of another embodiment;

FIG. 6 is an end view of the rotor of FIG. 5.

DESCRIPTION OF THE PREFERRED EMBODIMENTS

Referring first to FIG. 1 there is shown a self-propelled combine of the type marketed currently by the assignee herein under model designations 1440 and 1460 for example. The combine includes a body 24 supported on front drive wheels 26 and rear steerable wheels 28. An engine 30 powers the combine which is controlled by the operator from within a control center 32. A combine is provided with a header 34 for cutting the standing crop and conveying the cut crop to a feeder 36. The feeder 36 conveys the crop rearwardly into an axial threshing and separating unit including a generally cylindrical casing 38 and a generally cylindrical rotor 40 mounted therein. The rotor 40 is driven from the engine 30 and includes a front mounted impeller 42 which imparts rearward movement to the crop material received from the feeder 36. High speed rotation of the rotor 40 together with helical section vanes 44 on the upper inner surface of the casing 38 impel the material rearwardly in a generally helical direction about the rotor.

A plurality of rasp bars 46 and separator bars 48 mounted on the cylindrical surface of the rotor 40 cooperate respectively with a semi-cylindrical concave 50 and a semi-cylindrical grate 52 forming the bottom of the casing 38 to thresh the crop material such that most of the grain will be separated and impelled downwardly through the concave and grate. In practice the concave 50 consists of several removable sections extending approximately one-half the axial length of the casing 38. Likewise the grate 52 consists of several removable sections extending the remaining half of the casing length. The concave 50 and grate 52 define respectively threshing and separating zones.

The straw and other waste material is impelled rearwardly out of the casing 38 where a rotary beater 54 throws the straw rearwardly from the machine as shown. Most of the grain drops onto an auger bed 56 where it is conveyed rearwardly by a plurality of augers 58 for subsequent cleaning and collection.

The combine includes a system for cleaning chaff and foreign matter, or tailing etc. from the grain. This system includes a chaffer sieve 60, a grain sieve 62, a cleaning fan 64, a clean grain auger 66, and a tailings auger 68. The chaffer sieve is mounted for fore-and-aft oscillation so that grain and tailings received from the augers 58 and grate 52 will be sifted and passed to the grain sieve 62. The sieve 62 is also mounted for oscillation to separate the grain from the tailings so that the grain passes through the sieve and onto the clean grain auger 66 while the tailings are moved rearwardly onto the tailings auger 68. The cleaning fan 64 creates an air flow upwardly and rearwardly through both sieves to carry away the chaff. The clean grain collected by the auger 66 is delivered to a grain tank 24 within the machine, while the tailings collected by the auger 68 are conveyed to the casing 38 for rethreshing.

As best shown in FIG. 2 the rotor 40 is driven through means including a gear case 70 mounted adjacent to an end wall 72 of the casing 38. The gear case 70 includes an input shaft 74 and an output shaft 76, the latter projecting forwardly from a cylindrical housing 78 of the gear case 70. The output shaft 76 extends into splined connection with a hub structure 80 of the rotor 40.

The combine includes a structural bulkhead 82 extending transversely of the machine immediately rearwardly of the grate 52. The space between the bulkhead 82 and end wall 72 measured axially of the rotor 40 defines a discharge area for crop material from the threshing and separating mechanism downwardly onto a guide plate 84 where the rotary beater 54 acts to throw the material from the combine.

It will be seen in FIG. 2 that the rotor 40 extends rearwardly past the bulkhead 82 and terminates in a frusto-conical end portion 86 disposed concentrically about the hub structure 80.

A cover 88 is secured to the end wall 72 concentrically about the shaft 76 and shaft housing portion 78 of the gear case 70. The cover 88 extends toward the rotor 40 within the discharge area and includes a cylindrical portion 89 and a frusto-conical portion 90 disposed in spaced complementary relation to the frusto-conical end portion 86 of the rotor. The cover 88 includes an opening 92 of a diameter slightly greater than that of the hub structure 80.

The confronting surfaces of the frusto-conical portions 86 and 90 are smoothly finished which enhances movement of crop material outwardly from the space therebetween upon rotation of the rotor 40. The complementary frusto-conical configuration of the portions 86 and 90 orient the annular space therebetween at an angle which inhibits entry of crop material onto the drive shaft 76.

The invention in a second embodiment shown in FIGS. 5 and 6 includes a plurality of impeller blades 94 welded onto the frusto-conical portion 86 of the rotor 40 in closely spaced relation to the frusto-conical portion 90 of the gear case cover 88. The blades 94 are arranged as best shown in FIG. 6 to create an air flow outwardly away from the drive shaft 76 upon rotation of the rotor 40.

In operation the rotor 40 is driven at a high speed and the crop material is threshed and separated. The straw and chaff is moved into the discharge area between the bulkhead 82 and end wall 72 and thus is adjacent to the relatively rotatable portions of the rotor drive system. Prior to the present invention, this material could become wrapped on the rotor drive shaft and/or accumulate to create a fire danger due to friction from the moving machine parts. With the present invention the cover 88 provides overall protection to previously exposed moving parts. More specifically, the mutually facing frusto-conical portions 86 and 90 define an annular space which is angled relative to the vertical to minimize accumulation of material therebetween. Rotation of the rotor 40 creates a centrifugal force which tends to move material outwardly away from the drive shaft 76. And in the embodiment of FIGS. 5 and 6 the impeller blades 94 create an air flow during operation which helps to keep material from moving toward the drive shaft and accumulating around the shaft. And of course, the blades serve to physically move material particles away from the shaft if such should move into contact with the blades. In overall arrangement the end of the rotor 40 and the cover 88 are defined by smooth surfaces which minimize collection of crop material thereon. As a final barrier to material accumulation, the opening 92 is only very slightly larger than the hub structure 80 to minimize crop material entry into the cover 88.

By the foregoing Applicants have provided an improved rotor drive arrangement well suited to accomplish the objects of the invention.

What is claimed is:

1. In an axial flow combine, the combination comprising:
   a rotor casing having an open end for reception of crop material and an opposite discharge end having an end wall;
   a generally cylindrical rotor journalled for rotation within said casing for threshing and separating crop material as the rotor is driven;
   rotor drive means including a gear case proximate to said end wall and a drive shaft interconnected between the gear case and said rotor coaxially therewith for driving said rotor;
   a cover for said gear case interposed between said gear case and said rotor and disposed proximate to said end wall and including a smooth annular surface disposed about said drive shaft;
   said rotor having an annular end surface of smooth configuration disposed in spaced relation to said surface of said cover to define therebetween an annular space the smooth surfaces of which inhibit collection of crop material.

2. The subject matter of claim 1, wherein said surfaces are complementary and frusto-conical for further inhibiting entry of crop material therebetween to reduce wrapping thereof on said drive shaft.

3. In an axial flow combine, the combination comprising:
   a rotor casing having an open end for reception of crop material and an opposite discharge end having an end wall;
   a generally cylindrical rotor journalled for rotation within said casing for threshing and separating crop material as the rotor is driven;
   rotor drive means including a gear case proximate to said end wall and a drive shaft interconnected between the gear case and said rotor coaxially therewith for driving said rotor;
   said rotor having an annular end structure disposed proximate to said gear case; and
   impeller means on said rotor end structure for creating an air flow upon rotation of the rotor to direct crop material away from said drive shaft.

4. In an axial flow combine, the combination comprising:
   a rotor casing having an open end for reception of crop material and an opposite discharge end having an end wall;
   a generally cylindrical rotor journalled for rotation within said casing for threshing and separating crop material as the rotor is driven;
   rotor drive means including a gear case proximate to said end wall and a drive shaft interconnected between the gear case and said rotor coaxially therewith for driving said rotor;

a cover for said gear case and drive shaft secured to said end wall and having a frusto-conical surface disposed concentrically about said drive shaft;

said rotor having an end with a frusto-conical portion disposed in spaced complementary relation with said frusto-conical surface of said cover; and a plurality of impeller blades mounted on said frusto-conical portion of said rotor, whereby upon rotation of said rotor said blades create an air flow which clears crop material from between said cover and said rotor.

5. In an axial flow combine, the combination comprising:

a generally cylindrical rotor casing with one end open for reception of crop material and having an opposite discharge area defined in part by a bulkhead and an axially spaced end wall;

a generally cylindrical rotor journalled for rotation within said casing for threshing and separating crop material as the crop is moved thereby toward said discharge area;

rotor drive means including a gear case proximate to said end wall and a drive shaft interconnected between said gear case and said rotor coaxially therewith for driving said rotor;

a cover for said gear case and drive shaft secured to said end wall and having a frustoconical surface disposed concentrically about said drive shaft and projecting into said discharge area;

said rotor having an end disposed between said bulkhead and said end wall in said discharge area, said rotor end having a frusto-conical portion disposed in spaced complementary relation with said frustoconical surface of said cover; and a plurality of impeller blades on said frusto-conical portion of said rotor closely adjacent to said cover whereby upon rotation of said rotor an air flow is created which clears crop material from between said cover and said rotor outwardly through the discharge area.

* * * * *